United States Patent
Polmans et al.

(10) Patent No.: US 11,760,411 B2
(45) Date of Patent: Sep. 19, 2023

(54) METHOD FOR CONTROLLING A STEER-BY-WIRE STEERING SYSTEM WHEN A MAXIMUM AVAILABLE POWER LEVEL OF THE STEERING ACTUATOR IS REACHED

(71) Applicants: thyssenkrupp Presta AG, Eschen (LI); thyssenkrupp AG, Essen (DE)

(72) Inventors: Kristof Polmans, Tarrenz (AT); Manuel Rohrmoser, Thüringen (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 246 days.

(21) Appl. No.: 16/958,258

(22) PCT Filed: Jan. 15, 2019

(86) PCT No.: PCT/EP2019/050871
§ 371 (c)(1),
(2) Date: Jun. 26, 2020

(87) PCT Pub. No.: WO2019/141652
PCT Pub. Date: Jul. 25, 2019

(65) Prior Publication Data
US 2020/0339191 A1 Oct. 29, 2020

(30) Foreign Application Priority Data
Jan. 19, 2018 (DE) .................. 10 2018 101 181.4

(51) Int. Cl.
*B62D 5/04* (2006.01)
*B62D 15/02* (2006.01)
(Continued)

(52) U.S. Cl.
CPC ............... *B62D 6/008* (2013.01); *B62D 1/04* (2013.01); *B62D 5/006* (2013.01); *B62D 5/046* (2013.01);
(Continued)

(58) Field of Classification Search
None
See application file for complete search history.

(56) References Cited

U.S. PATENT DOCUMENTS

2018/0334184 A1* 11/2018 Jin ................. B62D 5/0469
2019/0031229 A1* 1/2019 Sakaguchi .......... B62D 5/0463

FOREIGN PATENT DOCUMENTS

| CN | 103587576 A | 2/2014 |
| CN | 107150718 A | 9/2017 |

(Continued)

OTHER PUBLICATIONS

Asai et al., Vehicle Steering Apparatus, 2003, Google Patent English Translation obtained on 69/2022. (Year: 2003).*
(Continued)

*Primary Examiner* — Adam D Tissot
*Assistant Examiner* — Laura E Linhardt
(74) *Attorney, Agent, or Firm* — thyssenkrupp North America, LLC

(57) ABSTRACT

Methods for controlling a steer-by-wire steering system including a steering actuator controlled via a steering request and brings about movement of a steering rack to steer vehicle wheels. A feedback actuator transmits reactions of the road to a steering wheel via an aligning torque. A setpoint position of the steering rack is determined in a signal processing unit based on a steering wheel steering angle. The setpoint position is transmitted with an actual position of the steering rack or with a measured wheel steering angle as an actual value to a control unit which calculates a
(Continued)

setpoint torque of an electric motor of the steering actuator. The method includes monitoring the power of the motor required to reach the determined setpoint position. When the required power exceeds the maximum power of the motor the motor is operated at maximum power torque present at the steering wheel is increased.

17 Claims, 3 Drawing Sheets

(51) Int. Cl.
*B62D 6/00* (2006.01)
*B62D 1/04* (2006.01)
*B62D 5/00* (2006.01)

(52) U.S. Cl.
CPC ....... *B62D 5/0424* (2013.01); *B62D 15/0215* (2013.01)

(56) References Cited

FOREIGN PATENT DOCUMENTS

| | | | |
|---|---|---|---|
| DE | 101 22 153 A | 11/2002 | |
| DE | 10 2005 028 153 A | 12/2006 | |
| DE | 10 2007 053 816 A | 5/2009 | |
| DE | 10 2015 006 491 A | 11/2016 | |
| EP | 0 854 075 A | 7/1998 | |
| EP | 1256507 B | 11/2002 | |
| EP | 1 468 900 A | 10/2004 | |
| EP | 1468900 A2 * | 10/2004 | ............ B62D 5/006 |
| FR | 2909960 A1 | 6/2008 | |
| JP | 2015182507 A | 10/2015 | |

OTHER PUBLICATIONS

English Translation of International Search Report issued in PCT/EP2019/050871, dated Apr. 11, 2019.

* cited by examiner

METHOD FOR CONTROLLING A STEER-BY-WIRE STEERING SYSTEM WHEN A MAXIMUM AVAILABLE POWER LEVEL OF THE STEERING ACTUATOR IS REACHED

CROSS REFERENCE TO RELATED APPLICATIONS

This application is a U.S. National Stage Entry of International Patent Application Serial Number PCT/EP2019/050871, filed Jan. 15, 2019, which claims priority to German Patent Application No. DE 10 2018 101 181.4, filed Jan. 19, 2018, the entire contents of both of which are incorporated herein by reference.

FIELD

The present disclosure generally relates to a method for controlling a steer-by-wire steering system.

BACKGROUND

In steer-by-wire steering systems, the position of the steered wheels is not coupled directly to the steering input means, for example a steering wheel. There is connection between the steering wheel and the steered wheels by means of electrical signals. The driver's steering request is tapped by a steering angle sensor, and the position of the steered wheels is controlled by means of a steering actuator in accordance with the driver's steering request. There is no provision of mechanical connection to the wheels to that after the steering wheel is activated no immediate false feedback conveyed to the driver. In order to simulate the reactions of the road on the steering wheel in steer-by-wire steering systems it is necessary to provide on the steering wheel or the steering column a feedback actuator (FBA) which applies a steering sensation in accordance with the desired reactions of the steering handle.

The control algorithm or the control method of a steer-by-wire steering system is preferably configured in such a way that the position of the electric steering actuator or the position of the steering rack follows a prescribed setpoint value with the shortest possible delay and without harmonics. Furthermore, it is desired that the position control has a robust control behavior which is not sensitive to internal and external interference variables.

During steer-by-wire steering operations the power of the electric steering actuator may not be sufficient to set the desired wheel steering angle quickly and precisely. In this case, the steering rack which is displaced in the longitudinal direction by the steering actuator cannot follow the desired steering rack position or the desired steering wheel rotational angle. This problem occurs, in particular, during a parking process since in this case the power requirements are the greatest. If the steering actuator cannot provide the calculated torque, an offset occurs between the setpoint position and the actual position of the steering rack. This leads to a situation in which the gear continues to steer until the setpoint position is reached even if the driver has already ended the steering process. The engagement of the steering actuator without a steering input is very irritating for the driver and therefore not acceptable.

Thus a need exists for controlling a steer-by-wire steering system in which a lack of power of the steering actuator is not perceived, or is perceived only to a significant extent, by the driver.

DETAILED DESCRIPTION

Figure 1:
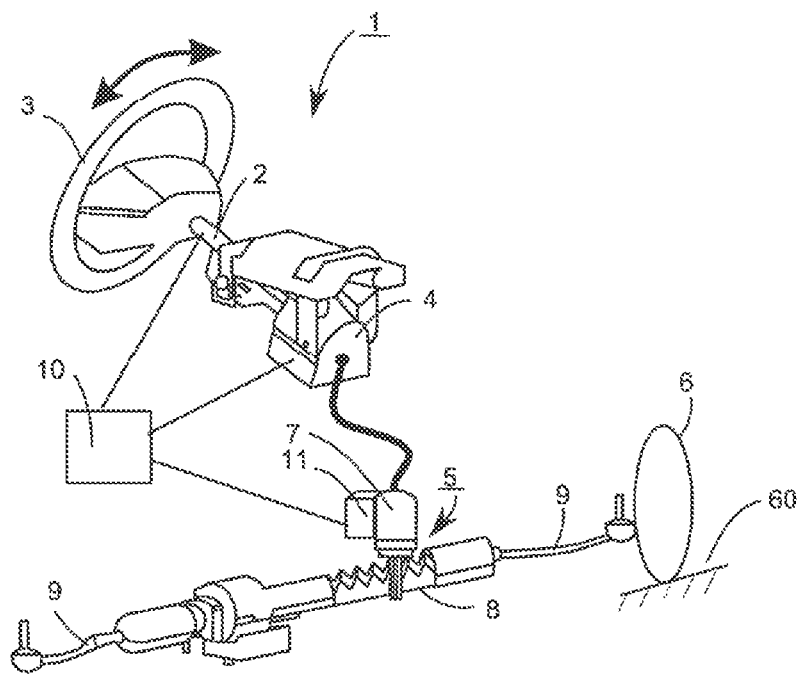
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to methods for controlling a steer-by-wire steering system and to steer-by-wire steering systems.

Accordingly, a method is provided for controlling a steer-by-wire steering system for motor vehicles comprising a steering actuator which acts on the steered wheels, is controlled electronically in accordance with a driver's steering request and brings about a translatory movement of a steering rack in order to steer the wheels, and a feedback actuator which transmits reactions of the road to a steering wheel in the form of an aligning torque, wherein a setpoint position of the steering rack is determined in a signal processing unit on the basis of a steering wheel steering angle, and said setpoint position is transmitted with an actual position of the steering rack or with a measured wheel steering angle as an actual value to a control unit which calculates therefrom a setpoint torque of the electric motor of the steering actuator wherein the following further method steps are provided for the control:
  monitoring the power of the electric motor required to reach the determined setpoint position;
  if the required power exceeds the maximum power of the electric motor, operating the electric motor with the maximum power and increasing an aligning torque which is present at the steering wheel and counteracts the further rotation.

As a result it is possible to prevent the driver of the motor vehicle from feeling the lack of power of the steering actuator during the steering process.

It is preferred here if the increase in the torque which is present at the steering wheel is carried out by means of the feedback actuator which applies a counter-torque, opposed to the steering command, into a steering shaft which is connected to the steering wheel. The increase in the torque which is present at the steering wheel is preferably dimensioned such that an offset between the steering wheel steering angle and the wheel steering angle can be reduced, particularly preferably even prevented.

Furthermore, method is provided for controlling a steer-by-wire steering system for motor vehicles comprising a steering actuator which acts on the steered wheels, is controlled electronically in accordance with a driver's steering request and brings about a translatory movement of a steering rack in order to steer the wheels, and a feedback actuator which transmits reactions of the road to a steering wheel in the form of an aligning torque, wherein a setpoint position of the steering rack is determined in a signal processing unit on the basis of a steering wheel steering angle, and said setpoint position is transmitted with an actual position of the steering rack or with a measured wheel steering angle as an actual value to a control unit which calculates therefrom a setpoint torque of the electric motor of the steering actuator, wherein the following further method steps for the control are provided:

monitoring a power level of the electric motor which is required to reach the determined setpoint position;

if the required power exceeds the maximum power of the electric motor, operating the electric motor with the maximum power and reducing the change in the setpoint position of the steering rack over time, specifically in such a way that in a neutral position of the steering wheel the actual position of the steering rack corresponds to the setpoint position of the steering rack.

As a result, lagging of the steering rack with respect to the setpoint position can be prevented, and the driver hardly notices, or does not notice at all, the lack of power of the steering actuator.

In this context, the control unit preferably has a limiting device which limits the change in the setpoint position over time in such a way that an offset which occurs between the setpoint position and actual position of the steering rack in the case of turning in is corrected again in the case of turning back.

In addition, in the event of the required power exceeding the maximum power of the electric motor there can be provision that a torque which is present at the steering wheel and which counteracts the rotation of the steering wheel is increased. The increase in the torque which is present at the steering wheel is preferably carried out by means of the feedback actuator which applies a counter torque, opposing the steering command, into a steering shaft which is connected to the steering wheel.

Furthermore, a steer-by-wire steering system for a motor vehicle is provided, wherein the steering system comprises an electronically controllable steering actuator which acts on steered wheels by means of a steering gear, a signal processing unit, a feedback actuator to which a driver's request for a steering angle can be applied by a driver via a steering wheel, and which outputs a feedback signal to the steering wheel in reaction to the driver's request and a driving state of the motor vehicle, a device for transmitting signals, which transmits the driver's request to the signal processing unit, wherein the signal processing unit determines a setpoint position of the steering gear and transmits it with an actual position of the steering rack or with a measured wheel steering angle as an actual value to a control unit which actuates the steering actuator in order to transform the driver's request into a deflection of the steered wheels. The steer-by-wire steering system is configured to carry out a method described above.

FIG. 1 shows a steer-by-wire steering system 1. A rotational angle sensor (not illustrated) on a steering shaft which senses the steering wheel steering angle $\alpha$ which is applied by rotating a steering input means 3 which is embodied in the example as a steering wheel. However, it is additionally also possible to sense a steering torque. Furthermore, a feedback actuator 4 is attached to the steering shaft 2, said feedback actuator 4 serving to simulate the reactions of the roadway 60 on the steering wheel 3 and therefore to provide the driver with feedback about the steering behavior and driving behavior of the vehicle. An electric steering actuator 5 controls the position of the steered wheels 6. The steering actuator 5 acts via a steering rack steering gear 7, such as for example a toothed steering rack steering gear, wherein the steering rack 8 acts indirectly on the steered wheels 6 via ball and socket joints (not illustrated) with track rods 9 and other components. In a control unit, which can also be referred to as a signal processing unit 10, a setpoint position Xd of the steering rack and the actuation of an electric motor 11 of the steering actuator, required to reach the setpoint position, are determined from the measured steering wheel steering angle $\alpha$.

Figure 2:
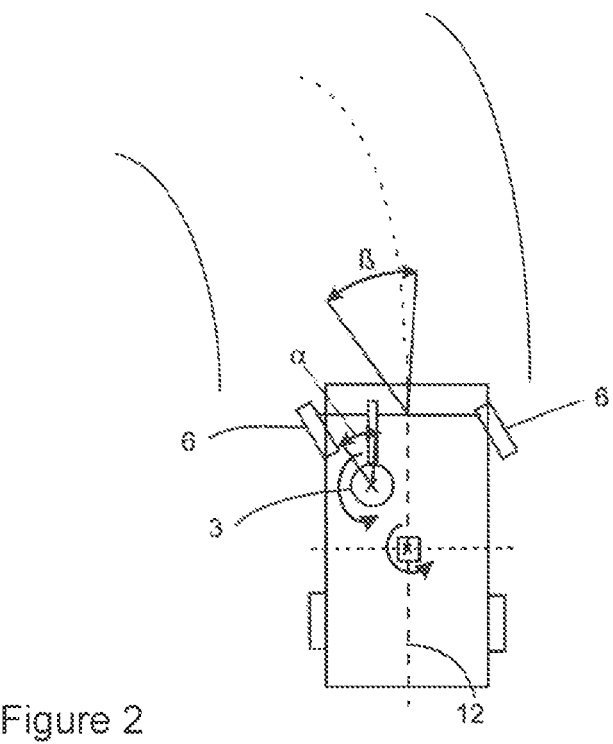
FIG. 2 is a plan view of a motor vehicle during cornering.

In FIG. 2, the steering wheel steering angle $\alpha$ and the wheel steering angle $\beta$ are illustrated. The steering wheel steering angle $\alpha$ is the steering angle which is applied to the steering wheel 3 by the driver. In the straight-ahead position this angle is zero degrees. In contrast, the wheel steering angle $\beta$ is the angle by which the vehicle wheel 6 is deflected or pivoted. The wheel steering angle $\beta$ lies between the longitudinal axis 12 of the motor vehicle and the transverse axis of the wheel 6 which lies perpendicularly with respect to the rotational axis of the wheel.

Figure 3:
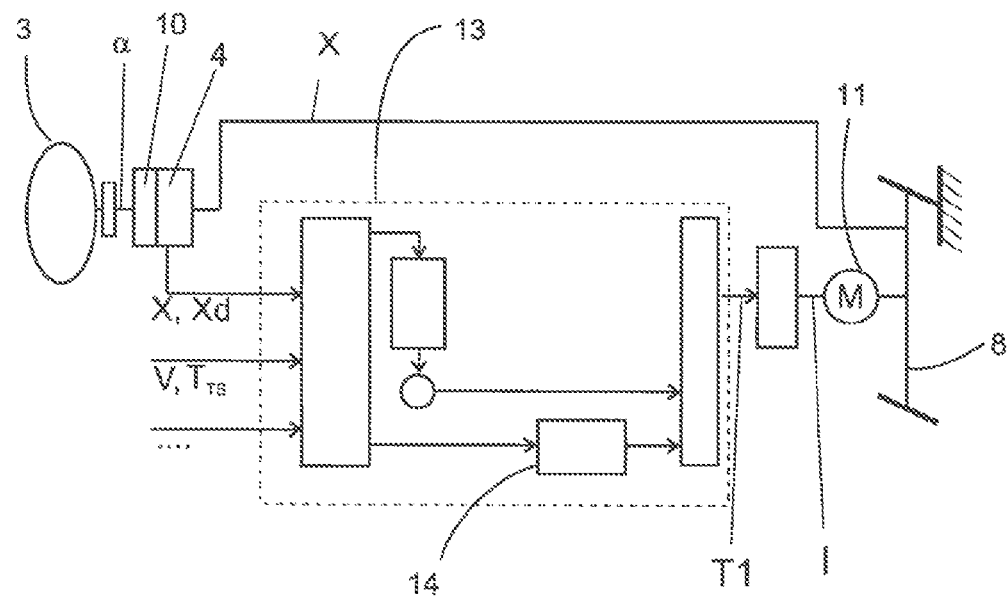
FIG. 3 is a block diagram of a controller of the steer-by-wire steering system.

FIG. 3 shows a control operation of the steering actuator 5. A setpoint position Xd of the steering rack 8 is determined in the signal processing unit 10 from the steering wheel steering angle $\alpha$ measured at the steering wheel 3. The determined setpoint position Xd and an actual position of the steering rack 8 or of the pivoting angle $\beta$ of the wheel (wheel steering angle) as an actual value X is transmitted to a control unit 13. In the example, the vehicle velocity V and/or the torque $T_{TS}$ applied to the steering wheel and/or further measured or calculated variables are provided as possible further input variables. The control unit 13 determines, as a setpoint variable, the actuating torque T1 of the electric motor 11 of the steering actuator 5. A respective setpoint current I, which is fed to the electric motor 11 which applies the torque, is then determined in a known fashion in the electric drive on the basis of this actuating torque T1.

In parallel with the controlled system, an adaptation device 14 is provided which influences the actuating torque T1 in the event of the steering power which is required for the closed-loop control exceeding the maximum power of the steering actuator.

The power which is required by the steering actuator 5 is monitored in the adaptation device 14. If the power which is required for the steering process exceeds the maximum power available, the steering actuator 5 is operated with maximum power. In this case, the steering actuator 5 cannot follow the setpoint position Xd of the steering rack 8, since a higher power level is required to reach the setpoint position Xd than the available power. The feedback actuator 4 outputs to the steering shaft 2, and therefore to the steering wheel 3 a counter-torque which is directed counter to the rotation and which simulates the known behavior of a steering system for the driver. In the text which follows, the counter-torque is also simply referred to as the torque which is present at the steering wheel.

Two methods for performing closed-loop control of the steer-by-wire steering system when the maximum power of the steering actuator 5 is exceeded.

The first method provides an increase in the torque at the steering wheel 3 in order to reach the maximum available power level of the steering actuator 5. The adaptation device 14 is in communication with the feedback actuator 4 for this purpose and communicates to the feedback actuator 4 that the maximum available power level of the steering actuator 5 has been exceeded. The feedback actuator 4 applies an increased counter-torque, opposing the steering command, into the steering shaft 2. The steering movement of the driver is therefore damped so that an offset between the steering rack position X and the steering wheel steering angle α can be prevented.

In the second method, the change in the setpoint position Xd of the steering rack 8 over time is reduced when the maximum available power level of the steering actuator is reached. A deviation between the setpoint position Xd and the actual position X of the steering rack 8 is therefore permitted. However, phase shift does not occur between the setpoint position and the actual position, i.e. the steering rack 8 does not lag the setpoint position Xd. This is understood as meaning that in the case of straight-ahead travel or in a neutral position of the steering wheel 3 the actual position X of the steering rack 8 corresponds to the setpoint position Xd of the steering rack 8. In particular, the actual position X of the steering rack 8 also corresponds to the setpoint position Xd of the steering rack 8 when the local or global maximum and minimum values and/or inflection points in the time profile of the steering rack position are reached. Lagging of the steering rack 8 can therefore be prevented. In this case, the driver does not feel the deviation between the setpoint position and the actual position. In order to limit the change in the setpoint position Xd over time, the adaption device 14 has an intelligent limiting device 15. The steering sensation of the feedback actuator 4 is preferably not adapted in this case. The adjustment device 15 limits the change in the setpoint position Xd over time in such a way that an offset between the setpoint position and actual position of the steering rack which occurs in the case of turning in is corrected again in the case of turning back. In the simplest case, in this context the difference between the requested and the set wheel steering angle β is converted proportionally in relation to the steering wheel steering angle α which is input by the driver, so that in the case of straight-ahead travel of the vehicle both angles assume the value 0.

Figure 4:
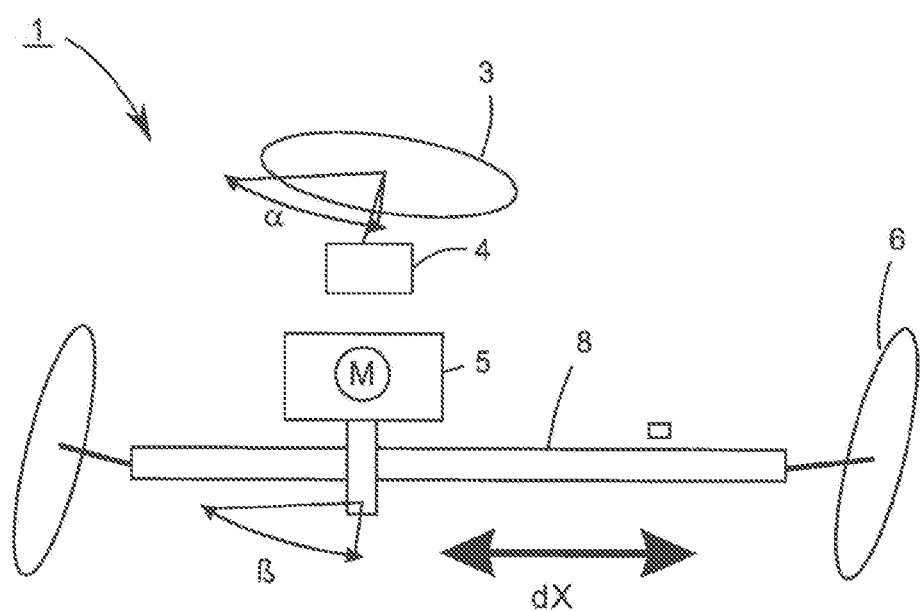
FIG. 4 is a schematic view of a steering wheel steering angle and of a wheel steering angle of a steer-by-wire steering system.

FIG. 4 shows a schematic view of a steer-by-wire steering system 1 with a steering wheel 3, a feedback actuator 4, a steering actuator 5 which acts on a steering rack 8, and steerable wheels 6 which are connected to the steering rack 8 via track rods. The steering actuator 5 brings about a translatory movement of the steering rack 8. The steering rack position X changes here in time with dX. The movement of the steering rack 8 brings about pivoting of the wheels 6 about the wheel steering angle β.

Figure 5:
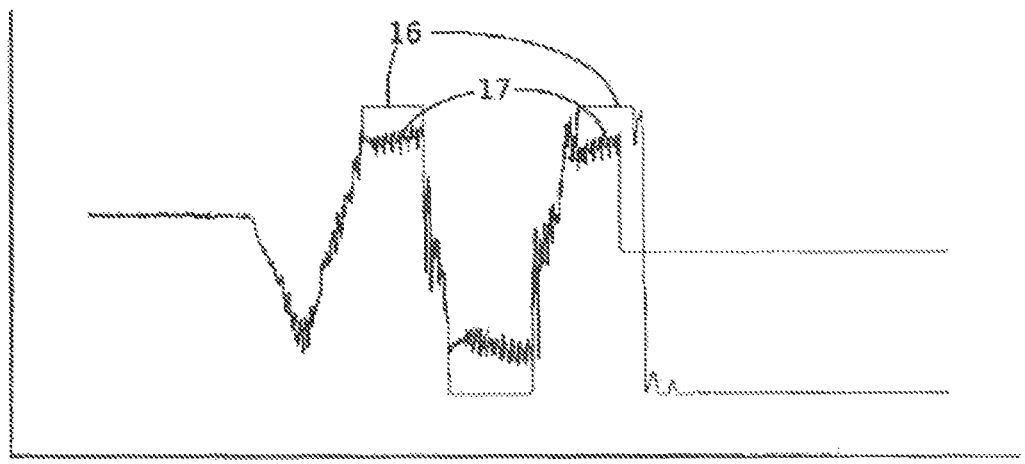
FIG. 5 is a diagram of a time profile of an actual torque and of a setpoint torque of the steering actuator during a steering movement.

FIG. 5 illustrates a time profile of a torque of the steering actuator 5 in Nm. A first curve 16 shows the torque request to the steering actuator (setpoint torque T1). A second curve 17 shows the torque (actual torque) which is actually applied by the steering actuator. Starting from a maximum power level of the steering actuator, the requested setpoint torque T1 can no longer be made available by the steering actuator. The actual torque therefore remains significantly behind the setpoint torque T1.

Figure 6:
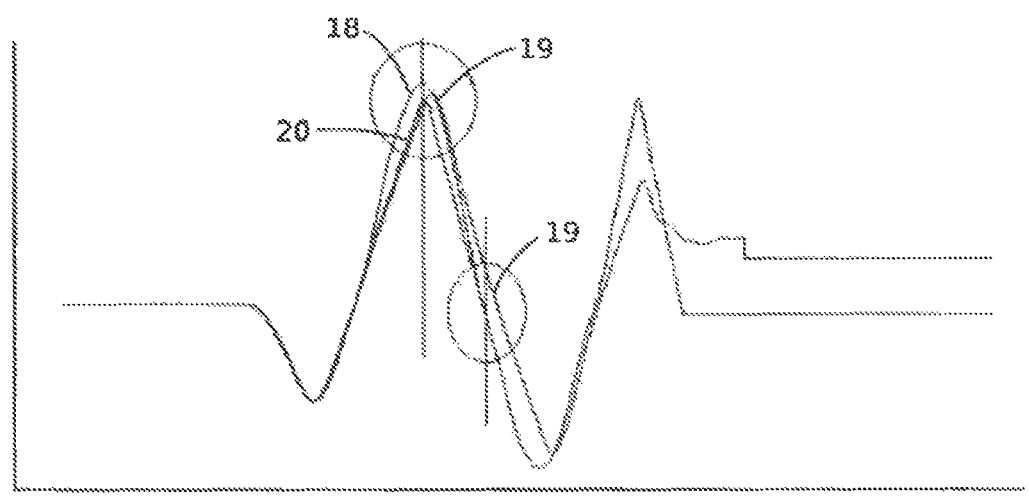
FIG. 6 is a diagram of a time profile of the actual steering rack position and of the setpoint steering rack position during a steering movement, as well as of the actual steering rack position with a correction.

FIG. 6 shows the time profile of the steering rack position. A first curve 18 shows the setpoint steering rack position Xd. A second curve 19 shows the actual steering rack position X. The power level which is required to reach the setpoint position cannot be applied by the electric motor of the steering actuator at the second deflection of the steering wheel. The steering speed at the steering wheel is too high. The setpoint steering rack position Xd can be reached only with a delay. The steering rack therefore lags the setpoint position. This state is undesired since the lagging of the steering rack is experienced as disruptive by the driver. Therefore, the wheels are, for example, deflected further even though a steering movement at the steering wheel no longer takes place. The third curve 20 shows the actual steering rack position with an activated limiting device. The maximum value of the second deflection or of the steering rack position and the subsequent neutral position at the steering wheel are reached simultaneously by the setpoint steering rack position and the adapted actual steering rack position. At the maximum value, there is here an offset between the setpoint position and the actual position, which is corrected again when the steering back occurs, so that both curves 18, 20 have their zero crossing in the neutral position.

It may also be advantageous to apply the first method and the second method simultaneously, i.e. both to act on the steering wheel by means of the feedback actuator and to avoid lagging of the steering rack by means of the intelligent limiting device.

What is claimed is:

1. A method of controlling a steer-by-wire steering system of a motor vehicle, the motor vehicle comprising a steering actuator configured to act on steered wheels of the motor vehicle, the steering actuator configured to be controlled electronically in accordance with a driver's steering request and cause a translatory movement of a steering rack to steer the wheels, and a feedback actuator which transmits reactions of the road to a steering wheel in the form of an aligning torque, wherein a setpoint position of the steering rack is determined in a signal processing unit on the basis of a steering wheel steering angle, and said setpoint position is transmitted with an actual position of the steering rack or with a measured wheel steering angle as an actual value to a control unit which calculates therefrom a setpoint torque of an electric motor of the steering actuator, providing for the control the following method steps:

determining the steering wheel steering angle applied to the steering wheel;
determining the setpoint position of the steering rack required to satisfy the steering wheel steering angle;
determining an actuating torque of the electric motor required to reach the determined setpoint position;
determining whether a required power needed to achieve the actuating torque exceeds a maximum power available of the electric motor;
based on determining that the required power needed exceeds the maximum power available of the electric motor:
(i) operating the electric motor with the maximum power,
(ii) reducing a change in the setpoint position of the steering rack over time such that in a neutral position of the steering wheel, an actual position of the steering rack corresponds to the setpoint position of the steering rack, wherein the actual position of the steering rack corresponds to the setpoint position of the steering rack when one of (i) local or global maximum and minimum values and (ii) inflection points in a time profile of the steering rack position are reached; and
(iii) outputting, at the feedback actuator, a counter-torque to a steering shaft that directs a counter-rotation input to the steering wheel thereby damping steering movement and preventing an offset between the actual position of the steering rack and the steering wheel steering angle.

2. The method of claim 1 wherein the increase in the torque which is present at the steering wheel is generated by the feedback actuator which applies a counter-torque, opposed to the steering command, into the steering shaft which is connected to the steering wheel.

3. The method of claim 1 wherein the increase in the torque which is present at the steering wheel is dimensioned such that an offset between the steering wheel steering angle and the wheel steering angle is reduced.

4. A method for controlling a steer-by-wire steering system for motor vehicles comprising a steering actuator which acts on the steered wheels, is controlled electronically in accordance with a driver's steering request and brings about a translatory movement of a steering rack in order to steer the wheels, and a feedback actuator which transmits reactions of the road to a steering wheel in the form of an aligning torque, wherein a setpoint position of the steering rack is determined in a signal processing unit on the basis of a steering wheel steering angle, and said setpoint position is transmitted with an actual position of the steering rack or with a measured wheel steering angle as an actual value to a control unit which calculates therefrom a setpoint torque of the electric motor of the steering actuator, wherein the following method steps for the control are provided:
determining the steering wheel steering angle applied to the steering wheel;
determining the setpoint position of the steering rack required to satisfy the steering wheel steering angle;
determining an actuating torque of the electric motor which is required to reach the determined setpoint position;
determining whether a required power needed to achieve the actuating torque exceeds a maximum power available of the electric motor;
based on determining that the required power needed exceeds the maximum power available of the electric motor:
(i) operating the electric motor with the maximum power, and
(ii) reducing the change in the setpoint position of the steering rack over time, such that in a neutral position of the steering wheel the actual position of the steering rack corresponds to the setpoint position of the steering rack, wherein the actual position of the steering rack corresponds to the setpoint position of the steering rack when one of (i) local or global maximum and minimum values and (ii) inflection points in a time profile of the steering rack position are reached.

5. The method of claim 4 wherein the control unit has a limiting device which limits the change in the setpoint position over time such that an offset which occurs between the setpoint position and actual position of the steering rack in the case of turning in is corrected again in the case of turning back.

6. The method of claim 4 wherein further comprising increasing an aligning torque which is present at the steering wheel and counteracts the further rotation when the required power exceeds the maximum power of the electric motor.

7. The method of claim 6 wherein the increase in the torque which is present at the steering wheel is carried out by the feedback actuator which applies a counter-torque, opposed to the steering command, to a steering shaft which is connected to the steering wheel.

8. A steer-by-wire steering system for a motor vehicle comprising:
an electronically controllable steering actuator configured to act on steered wheels by means of a steering gear,
a signal processing unit,
a feedback actuator to which a driver's request for a steering angle can be applied by a driver via a steering wheel, and which outputs a feedback signal to the steering wheel in reaction to the driver's request and a driving state of the motor vehicle,
a device for transmitting signals, which transmits the driver's request to the signal processing unit,
wherein the signal processing unit is configured to determine a setpoint position of the steering gear and transmits the setpoint position with an actual position of a steering rack or with a measured wheel steering angle as an actual value to a control unit which actuates the steering actuator in order to transform the driver's request into a deflection of the steered wheels, wherein the actual position of the steering rack corresponds to the setpoint position of the steering rack when one of (i) local or global maximum and minimum values and (ii) inflection points in a time profile of the steering rack position are reached,
wherein the steer-by-wire steering system is configured to perform the following steps:
determining the steering wheel steering angle applied to the steering wheel;
determining the setpoint position of the steering rack required to satisfy the steering wheel steering angle;
determining an actuating torque of the electric motor required to reach the determined setpoint position; and
determining whether a required power needed to achieve the actuating torque exceeds a maximum power of the electric motor;
based on determining that the required power needed exceeds the maximum power of the electric motor:
(i) operating the electric motor with the maximum power,
(ii) reducing a change in the setpoint position of the steering rack over time such that in a neutral position of the steering wheel, an actual position of the steering rack corresponds to the setpoint position of the steering rack; and
(iii) increasing the feedback signal present at the steering wheel to oppose further rotation of the steering wheel.

9. The method of claim 1 wherein a difference between a requested and a set wheel steering angle is converted proportionally in relation to the steering wheel steering angle whereby both the requested and set wheel steering angles assume a value of 0 in straight-ahead travel of the motor vehicle.

10. The method of claim 1 wherein a maximum value of the actual position of the steering rack and a subsequent neutral position at the steering wheel are reached simultaneously by the setpoint position of the steering rack and the actual steering rack position.

11. The method of claim 1 wherein an offset between the setpoint position of the steering rack and the actual position of the steering rack is corrected in the neutral positon upon a steering back input to the steering wheel.

12. The method of claim 4 wherein a difference between a requested and a set wheel steering angle is converted proportionally in relation to the steering wheel steering angle whereby both the requested and set wheel steering angles assume a value of 0 in straight-ahead travel of the motor vehicle.

13. The method of claim 4 wherein a maximum value of the actual position of the steering rack and a subsequent neutral position at the steering wheel are reached simultaneously by the setpoint position of the steering rack and the actual steering rack position.

14. The method of claim 4 wherein an offset between the setpoint position of the steering rack and the actual position of the steering rack is corrected in the neutral positon upon a steering back input to the steering wheel.

15. The system of claim 8 wherein a difference between a requested and a set wheel steering angle is converted proportionally in relation to the steering wheel steering angle whereby both the requested and set wheel steering angles assume a value of 0 in straight-ahead travel of the motor vehicle.

16. The system of claim 8 wherein a maximum value of the actual position of the steering rack and a subsequent neutral position at the steering wheel are reached simultaneously by the setpoint position of the steering rack and the actual steering rack position.

17. The system of claim 8 wherein an offset between the setpoint position of the steering rack and the actual position of the steering rack is corrected in the neutral positon upon a steering back input to the steering wheel.

* * * * *